(12) United States Patent
Sasaki

(10) Patent No.: US 7,693,351 B2
(45) Date of Patent: Apr. 6, 2010

(54) INTERPOLATION PROCESSING METHOD, INTERPOLATION PROCESSING PROGRAM, AND IMAGING APPARATUS

(75) Inventor: Toru Sasaki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 1113 days.

(21) Appl. No.: 11/335,423

(22) Filed: Jan. 18, 2006

(65) Prior Publication Data

US 2006/0159362 A1 Jul. 20, 2006

(30) Foreign Application Priority Data

Jan. 18, 2005 (JP) .............................. 2005-010032

(51) Int. Cl.
*G06K 9/36* (2006.01)
*G06K 9/32* (2006.01)

(52) U.S. Cl. ........................................ 382/300; 382/276

(58) Field of Classification Search ................ 382/276, 382/300, 305, 312, 269, 275; 358/525, 533, 358/1.9, 3.26; 345/608–611, 647
See application file for complete search history.

(56) References Cited

U.S. PATENT DOCUMENTS

| 5,294,976 A | 3/1994 | Ohyama et al. |
| 5,450,128 A | 9/1995 | Ohyama et al. |
| 6,144,873 A * | 11/2000 | Madore et al. ............... 600/410 |
| 6,813,040 B1 * | 11/2004 | Uchino et al. ................ 358/1.9 |
| 6,950,211 B2 * | 9/2005 | Trifonov et al. ............. 358/3.26 |

OTHER PUBLICATIONS

Mukherjee, et al, "Markov random field processing for color demosaicing", Pattern Recognition Letters 22, 2001, pp. 339-351.
Sakamoto et al, "Software Pixel Interpolation For Digital Still Cameras Suitable For A 32-BIT MCU", IEEE Transactions on Consumer Electronics, vol. 44, No. 4, Nov. 1998, pp. 1342-1352.

* cited by examiner

*Primary Examiner*—Kanji Patel
(74) *Attorney, Agent, or Firm*—Rossi, Kimms & McDowell LLP

(57) ABSTRACT

An interpolation processing method for performing interpolation processing of image data obtained by photoelectrically converting an object image using interpolation data, includes a first step of estimating object information, a second step of generating first input image data based on the object information, a third step of generating first transformation data from the first input image data to the image data, a fourth step of generating second transformation data from the first input image data to interpolated image data after the interpolation processing, and a fifth step of generating the interpolation data using the first and second transformation data.

4 Claims, 15 Drawing Sheets

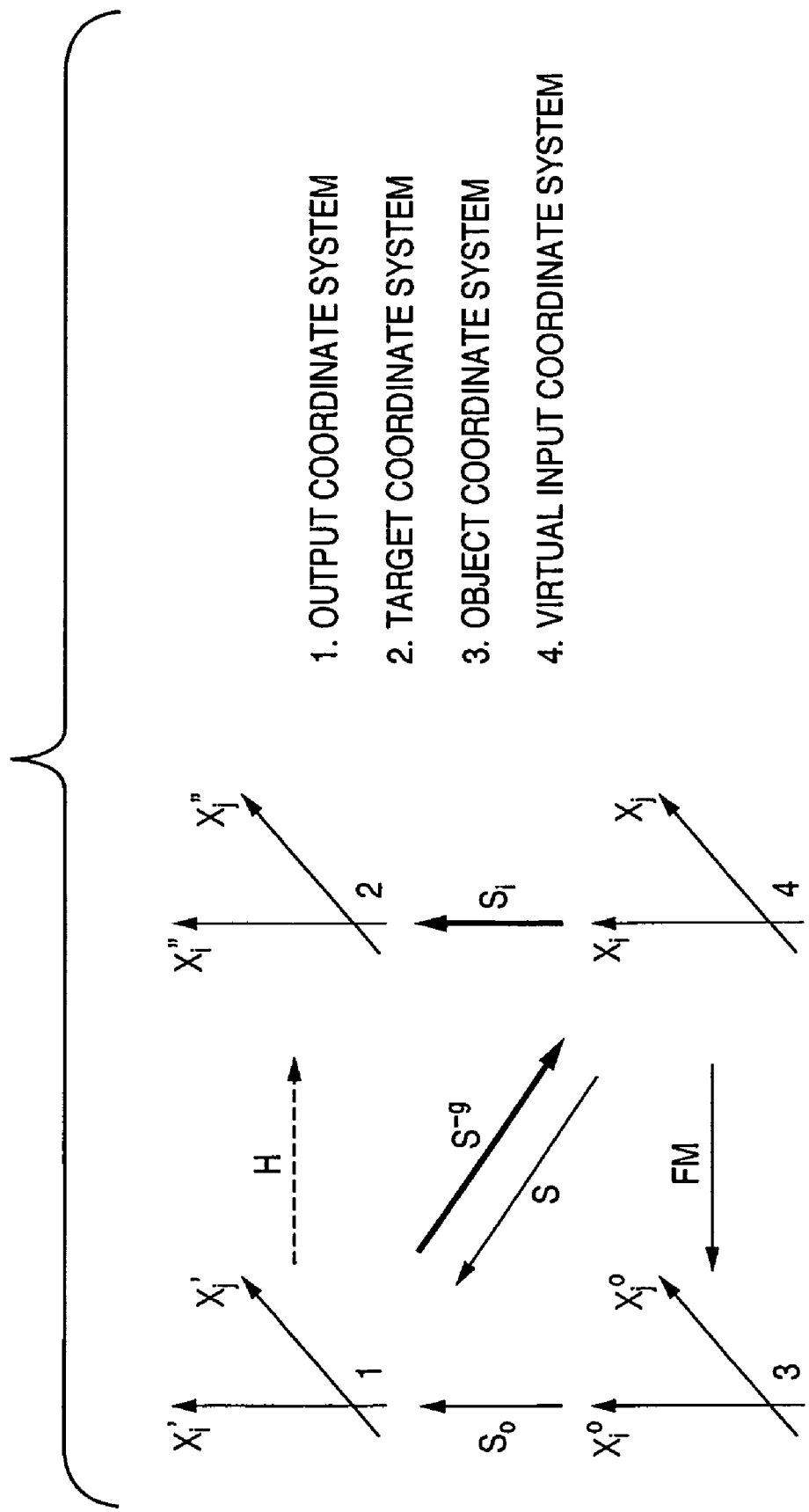

FIG. 12

$$\begin{bmatrix} 0.5 & 0.7 & 0.85 & 0.9 & 0.9 & 0.85 & 0.7 & 0.5 \\ 0.5 & 0.7 & 0.85 & 0.9 & 0.9 & 0.85 & 0.7 & 0.5 \\ 0.5 & 0.7 & 0.85 & 0.9 & 0.9 & 0.85 & 0.7 & 0.5 \\ 0.5 & 0.7 & 0.85 & 0.9 & 0.9 & 0.85 & 0.7 & 0.5 \\ 0.5 & 0.7 & 0.85 & 0.9 & 0.9 & 0.85 & 0.7 & 0.5 \\ 0.5 & 0.7 & 0.85 & 0.9 & 0.9 & 0.85 & 0.7 & 0.5 \\ 0.5 & 0.7 & 0.85 & 0.9 & 0.9 & 0.85 & 0.7 & 0.5 \\ 0.5 & 0.7 & 0.85 & 0.9 & 0.9 & 0.85 & 0.7 & 0.5 \end{bmatrix}$$

INTERPOLATION PROCESSING METHOD, INTERPOLATION PROCESSING PROGRAM, AND IMAGING APPARATUS

FIELD OF THE INVENTION

The present invention relates to interpolation processing for suppressing noise of an image obtained from an imaging apparatus.

BACKGROUND OF THE INVENTION

Conventionally, in an imaging apparatus having an imaging element (an image sensor such as CCD sensor, CMOS sensor, or the like), when the image sensor samples an image formed by a photographing lens system, aliasing noise such as false color, moiré fringes, or the like is generated.

In general, ordinary noise can be suppressed to some extent by taking statistical properties into account. However, aliasing noise is often globally generated on an image depending on the object, and it is difficult to apply an ordinary noise measure.

As one of methods of suppressing this aliasing noise, a method of estimating a pixel value which should be present between pixels by interpolation processing, and reconstructing an image before sampling is known. With this method, since the suppression amount of aliasing noise is influenced by the interpolation processing, it is important to select appropriate interpolation processing.

As a conventional interpolation processing method used in an imaging apparatus (imaging system), a method described in, e.g., T. Sakamoto et al., IEEE Trans. on Cons. Elec., 44, 1342-1352 (1998), and J. Mukherjee, Patt. Rec. Lett. 22, 339-351 (2001) are known. These interpolation processing methods used in the imaging system are used to reconstruct a completely captured image having full colors from an image sampled for respective colors by a color filter array. In addition, as methods based on a convolution operation, a nearest neighbor method, bilinear method, cubic convolution method, and the like are known.

As interpolation processing methods using object information captured in advance, a method of estimating a color strength value by assuming that a strength ratio of R, G and B, and G in a local region is constant, and a method of estimating a color after an object shape is divided into an edge portion and the like have been proposed.

Furthermore, an interpolation processing method that performs image reconstruction with high precision by applying an advanced image reconstruction technique using a generalized inverse matrix has been proposed. U.S. Pat. Nos. 5,294,976 and 5,450,128 have proposed an interpolation method which reconstructs an image using a sensitivity function that expresses a mapping from an original image to an observation image as a matrix.

Conventionally, it is possible to suppress aliasing noise by reconstructing an image before sampling by an image sensor. However, in order to suppress this aliasing noise, a high interpolation precision level is required. However, the nearest neighbor method based on the convolution operation, the method using color information or edge information of an object, and the like have low interpolation precision since they execute interpolation processing using only pixel values very near a pixel to be interpolated, thus lowering the suppression effect of aliasing noise.

Also, when only a mapping from an original image to an observation image is considered like in the interpolation reconstruction method of U.S. Pat. Nos. 5,294,976 and 5,450,128, aliasing noise cannot be controlled since it is generated depending on an object.

It is an object of the present invention to provide an interpolation processing method, an interpolation processing program, and an imaging apparatus, which can suitably suppress aliasing noise.

SUMMARY OF THE INVENTION

According to the first aspect of the present invention, there in provided an interpolation processing method for performing interpolation processing of image data obtained by photoelectrically converting an object image using interpolation data, comprising a first step of estimating object information, a second step of generating first input image data based on the object information, a third step of generating first transformation data from the first input image data to the image data, a fourth step of generating second transformation data from the first input image data to interpolated image data after the interpolation processing and a fifth step of generating the interpolation data using the first and second transformation data.

According to the second aspect of the present invention, there in provided an interpolation processing program for performing interpolation processing of image data obtained by photoelectrically converting an object image using interpolation data, comprising a first step of estimating object information, a second step of generating first input image data based on the object information, a third step of generating first transformation data from the first input image data to the image data, a fourth step of generating second transformation data from the first input image data to interpolated image data after the interpolation processing and a fifth step of generating the interpolation data using the first and second transformation data.

According to the third aspect of the present invention, there in provided an interpolation processing apparatus for performing interpolation processing of image data obtained by photoelectrically converting an object image using interpolation data, comprising an object information estimation unit adapted to estimate object information, an input image data generation unit adapted to generate first input image data based on the object information, a transformation data generation unit adapted to generate first transformation data from the first input image data to the image data, and second transformation data from the first input image data to interpolated image data after the interpolation processing, an interpolation data generation unit adapted to generate the interpolation data using the first and second transformation data and a control unit adapted to perform the interpolation processing using the interpolation data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is an explanatory view of coordinate systems and transformation matrices according to the first embodiment of the present invention;

FIG. 12 is a view showing a weighting distribution (weighted matrix) according to the fourth embodiment of the present invention;

DETAILED DESCRIPTION OF THE PREFERRED EMBODIMENTS

Preferred embodiments of the present invention will be described hereinafter.

Prior to a description of the embodiments, a vector, vector space, and coordinate system used in this embodiment will be explained. The vector used in this embodiment is not expressed using position coordinates, but it is expressed by giving dimensions to the luminance values and frequency intensity values of an object. For example, an image captured by an imaging apparatus can be expressed as a vector x including respective pixel values as components by:

$$X^T = (a_1, a_2, \ldots, a_N) \quad (1)$$

where $a_i$ (i=1, 2, ..., N) is the i-th pixel value, and N is the total number of pixels.

This embodiment handles such multi-dimensional vector space, in which a data expression form can be changed by coordinate transformation. For example, a frequency distribution x' of an image can be calculated by applying coordinate transformation of the vector x given by equation (1), which transformation is given by:

$$x = Fx', F = [f_1, f_2, \ldots, f_N] \quad (2)$$

where F is a matrix indicating an (N×N)-dimensional frequency base, and column vectors $f_i$ (i=1, 2, ..., N) of F have component distributions corresponding to N frequencies. On a coordinate system after transformation, $f_i$ serves as a base vector.

Since the coordinate system is relatively determined, a reference coordinate system (a coordinate system having a unit vector as a base vector) must be defined. Hence, a coordinate system that gives dimensions for respective pixels like equation (1) will be referred to as a pixel coordinate system, which defines a reference coordinate system.

First Embodiment

Figure 1:
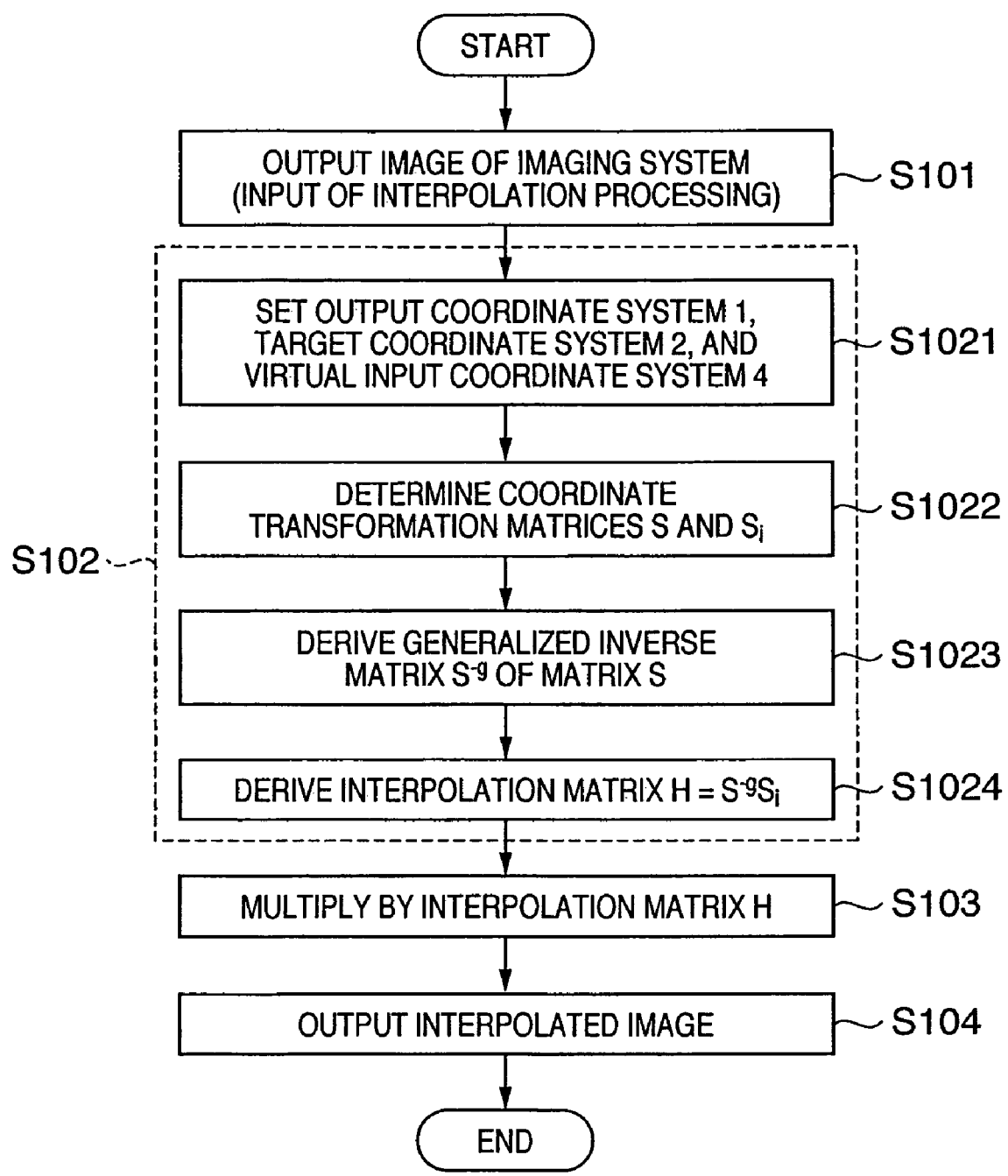
FIG. 1 is a flowchart of an interpolation processing method (program) according to the first embodiment of the present invention.

FIG. 1 is a flowchart for explaining an interpolation processing method (interpolation processing program) according to the first embodiment of the present invention. In the interpolation processing in this embodiment, output image data captured by a light-receiving element (photoelectric conversion element such as a CCD, CMOS, or the like) such as an image sensor or the like of an imaging apparatus via an imaging optical system (which may arbitrarily include a lens, mirror, diffraction grating, and the like) of the imaging apparatus such as a digital camera, digital video camera, or the like is input to an arithmetic circuit in the imaging apparatus, an external arithmetic device, or the like (S101) to express it as a vector on the pixel coordinate system and to generate an interpolation matrix (interpolation data) H (S102). The generated interpolation matrix H and the output image data are multiplied (S103) to obtain interpolated image data after the interpolation processing (S104).

A generation sequence of the interpolation matrix H in the interpolation processing of this embodiment will be described below. As shown in FIGS. 1 and 2, an output coordinate system (output image data) 1, target coordinate system (interpolated image data) 2, and virtual input coordinate system (first input image data) 4 obtained by sensing an object coordinate system 3 (i.e., by transforming that coordinate system using a transformation matrix $S_o$ (transformation data $S_o$)) via an imaging optical system or the like are set (S1021). A transformation matrix (first conversion data) S as a mapping from the virtual input coordinate system 4 to the output coordinate system 1, and a transformation matrix (second transformation data) $S_t$ as a mapping from that virtual input coordinate system to the target coordinate system 2 are calculated (S1022) to calculate a generalized inverse matrix $S^{-g}$ of the transformation matrix S(S1023). Using these transformation matrices S and $S_t$, an interpolation matrix $H = S_t S^{-g}$ is generated (S1024).

Thus, an interpolated image x' that has undergone the interpolation processing is given by:

$$x' = Hx = S_t S^{-g} x \quad (3)$$

where x is the output image of the imaging system.

FIG. 2 is a view showing the relationship among the vector spaces, coordinate systems, and mappings. The output coordinate system 1 is that of an output image vector of the imaging system, and the target coordinate system 2 is that of an ideal image vector (an image vector after interpolation processing) in which aliasing noise is controlled. A vector space to which these coordinate systems belong is set to have the number N' of dimensions larger than the number N of pixels which form the output image of the imaging system. N' corresponds to the number of pixels of an original image as a discretized model of an object, and the output coordinate system 1 and target coordinate system 2 are formed as partial spaces of the (N')-dimensional vector space.

In this embodiment, the pixel coordinate system is normally used as the output coordinate system 1 and target coordinate system 2, but the user can arbitrarily select these coordinate systems for the purpose intended in principle. A frequency coordinate system is used in an explanation of aliasing noise, and the interpolation matrix H to be calculated serves as a transformation matrix from the output coordinate system 1 to the target coordinate system 2, as shown in FIG. 2.

Since the output coordinate system 1 and target coordinate system 2 form different partial spaces, an innumerable number of interpolation matrices H exist unless a transformation criterion is set. Hence, the object coordinate system 3, i.e., a pixel coordinate system that expresses an original image (object) is provided.

The virtual input coordinate system 4 is characterized in that base vectors are not normalized, and base vectors with small norms exist. The reason why a term "virtual input coordinate system purport" is used is to clearly express that this coordinate system has base vectors different from those of the object coordinate system 3, and the vector values do not express the original image itself.

In this embodiment, using the coordinate systems set in this way, the interpolation matrix H is generated along a path: output coordinate system 1→virtual input coordinate system 4→target coordinate system 2, as shown in FIG. 2.

The relationship between the aliasing noise and coordinate transformation matrix will be described below. Broadly interpreted, aliasing noise is not confined to an issue of frequency components, but it will be generally described below using transfer of frequency components given by:

$$x_v' = S_v x_v \quad (4)$$

where $x_v$ and $x_v'$ are vectors that respectively express the original image and output image using frequency coordinate systems, and $S_v$ is a matrix that expresses a mapping between the coordinate systems. This matrix $S_v$ can be obtained based on the imaging relationship of the imaging system. For example, when the imaging system includes defocus processing and sampling processing, the imaging relationship of the imaging system can be approximated by:

$$x_p' = S_p x_p = P_s P_d x_p \quad (5)$$

where $x_p$ and $x_p'$ are vectors which express the original image and output image using pixel coordinate systems, and $S_p$ is a matrix which expresses a mapping between these coordinate systems, and can be expressed by the product of a sampling matrix $P_s$ and defocus matrix $P_d$.

Figure 3A:
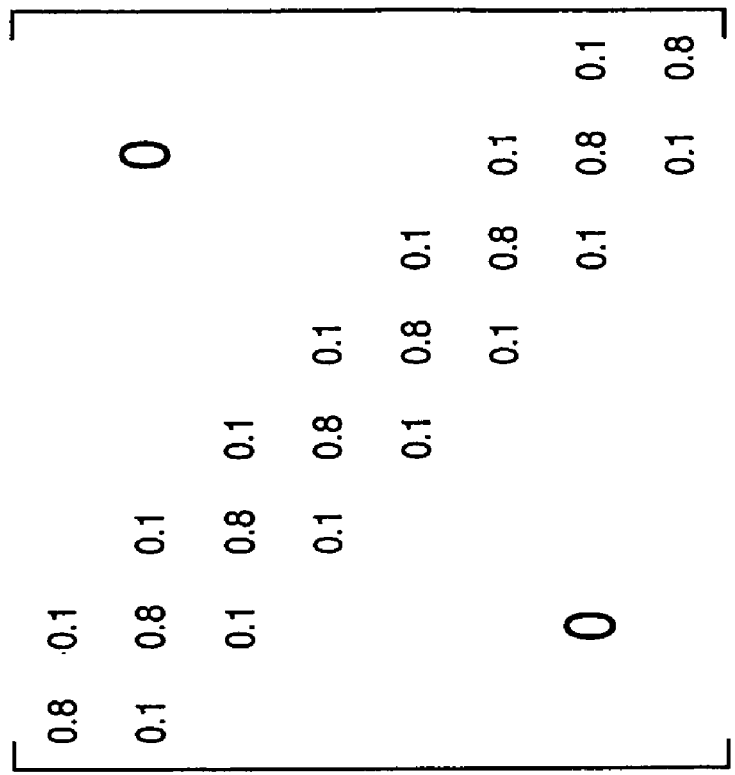
FIGS. 3A and 3B are explanatory views of a sampling matrix and defocus matrix according to the first embodiment of the present invention.
Figure 3B:
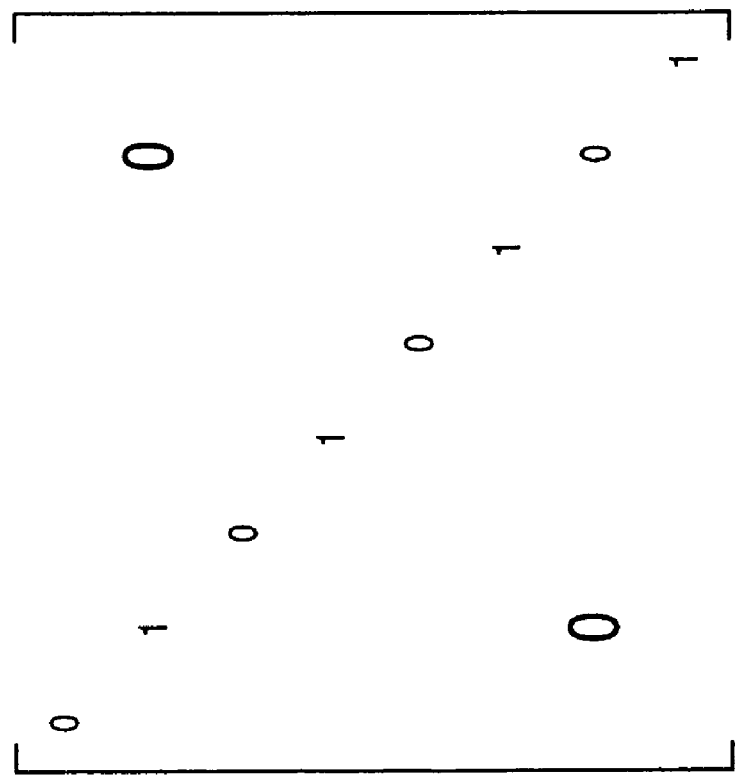

The sampling matrix $P_s$ is a diagonal matrix shown in FIG. 3A, and samples pixels of dimensions whose diagonal components are "1". The defocus matrix $P_d$ is a matrix which expresses a defocus due to charge diffusion by the optical system and pixel apertures of the image sensor, and has values in components near the diagonal components, as shown in FIG. 3B. Since information of a defocus amount and the number of sample points are known, $S_p$ can be easily calculated. The relational expression of equation (4) is obtained by transforming a base function like:

$$x_p' = S_p x_p \rightarrow (F^T x_p') = (F^T S_p F)(F^T x_p) \rightarrow x_v' = S_v x_v \quad (6)$$

where F is a frequency base matrix.

Figure 4B:
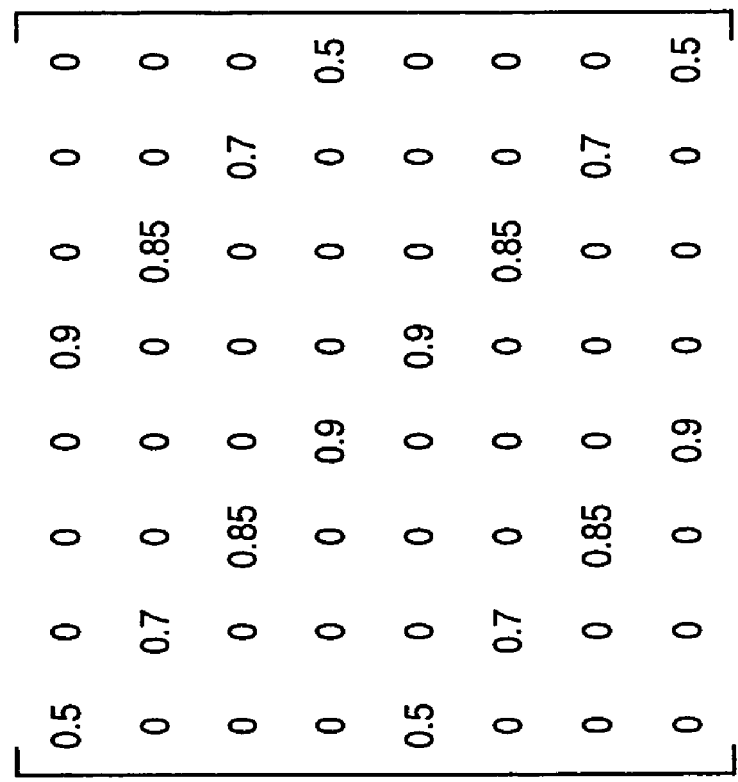
FIGS. 4A and 4B are explanatory views of the ideal and actual distributions of a frequency transfer matrix $S_y$ according to the first embodiment of the present invention.
Figure 4A:
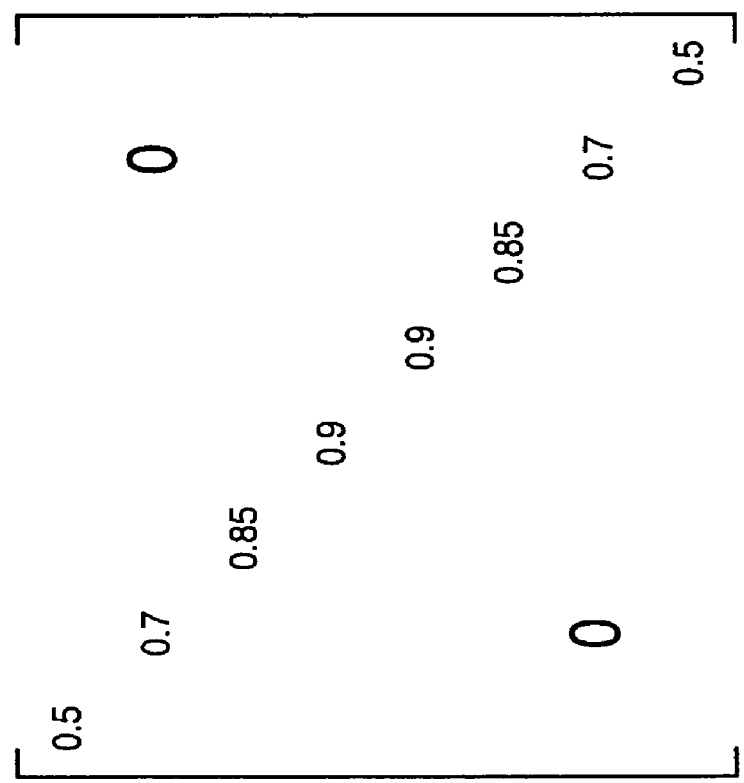

FIG. 4A shows the distribution of absolute values of components of the ideal matrix $S_v$. This matrix $S_v$ is preferably a diagonal matrix in which input and output frequency components have one-to-one correspondence, and undergo weighting corresponding to an MTF.

However, since the components of the matrix $S_v$ have high peak values in non-diagonal components due to the sampling matrix, as shown in FIG. 4B, input frequency components which do not correspond to the frequency components of the output image $x_v'$ are consequently mixed, and the mixed components become aliasing noise. Moiré fringes as one kind of aliasing noise appear in an image as a stripe pattern corresponding to a specific low-frequency component, and such phenomenon can be understood as a result of enhancement of the frequency intensity value by the mixed components.

The relationship between the generalized inverse matrix and aliasing noise will be described below. Details about the generalized inverse matrix are described in W. Menke, Geophysical Data Analysis: Discrete Inverse Theory, Academic Press (1989: Japanese edition). In this embodiment, a generalized inverse matrix of $S_v$ in equation (4) is generated to allow easy association with aliasing noise. A generalized inverse matrix $S_v^{-g}$ of $S_v$ is derived using a result of singular value decomposition given by:

$$S_v = U \Lambda V^T \quad (7)$$

where U and V are unitary matrices (those which have complex transposed matrices as inverse matrices) having the same number of dimensions as those of the input and output coordinate systems, respectively, and $\Lambda$ is a diagonal matrix having p nonzero diagonal components. Using this equation, a generalized inverse matrix is given by:

$$S_v^{-g} = V_p \Lambda_p^{-1} U_p^T \text{ or } S_v^{-g} = V_p (\Lambda_p + \epsilon I_p)^{-1} U_p^T \quad (8)$$

where a suffix p indicates the total number of nonzero components in the diagonal components of $\Lambda$ in equation (7). A matrix with the suffix p indicates a matrix which includes only column vectors of dimensions corresponding to nonzero diagonal components from the matrix given by equation (7). Also, $\epsilon$ is a bias component, and I is a unit matrix.

Figure 5:
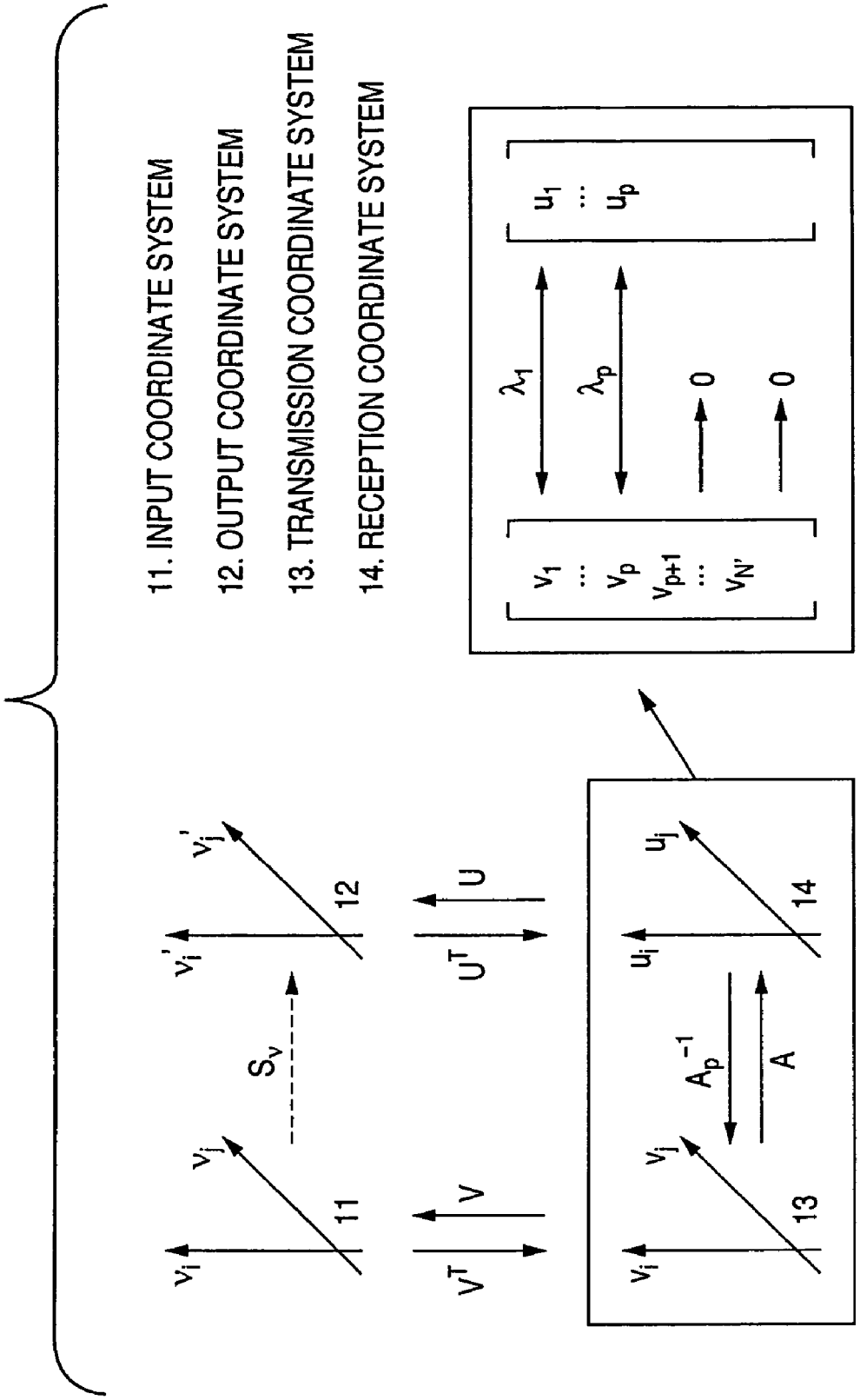
FIG. 5 is a view showing the relationship between singular value decomposition and a generalized inverse matrix according to the first embodiment of the present invention.

FIG. 5 shows the relationship between the singular value decomposition and generalized inverse matrix. The singular value decomposition expresses the matrix (mapping) $S_v$ from an input coordinate system 11 to an output coordinate system 12 via a transmission coordinate system 13 and reception coordinate system 14 which are coordinate-transformed via U and V. Note that the reason why terms "transmission" and "reception" are used is that components of vectors expressed by the transmission coordinate system 13 are transferred to those of the reception coordinate system 14 without any interference.

A mapping from the transmission coordinate system 13 to the reception coordinate system 14 is the diagonal matrix $\Lambda$, and diagonal components represent the attenuation rates of vector components to be transferred. On the transmission coordinate system 13, vector components with nonzero attenuation rates will be referred to as signal components, and its base vectors will be referred to as signal base vectors.

Since the generalized inverse matrix is transformation that inversely traces the singular value decomposition via the reception coordinate system 14 and transmission coordinate system 13, components other than signal components are not reconstructed. For this reason, only a coordinate system of low dimensions formed by only the signal base vectors is reconstructed. When noise is to be prevented from being amplified in components whose attenuation rate is close to zero upon reconstruction, a method using the bias component $\epsilon$ is used.

If the signal base vectors are frequency base vectors equal to or lower than the Nyquist frequency, an image obtained by the generalized inverse matrix is reconstructed precisely in appearance. However, as shown in FIGS. 4A and 4B, the matrix $S_v$ mixes frequency components equal to or higher than the Nyquist frequency in low-frequency components, so an image is never reconstructed precisely.

Since the matrix $S_v^{-g}$ is uniquely determined by equations (7) and (8), the aliasing noise suppression effect cannot be obtained by manipulating equations used to calculate the generalized inverse matrix. In other words, since an image including aliasing noise is reconstructed even using the generalized inverse matrix of the matrix $S_v$, the noise suppression effect is low.

Hence, in this embodiment, the virtual input coordinate system 4 is adopted in place of coordinate transformation from the input coordinate system 11 to the output coordinate system 12, and the interpolation matrix H is generated along a path: output coordinate system 1→virtual input coordinate system 4→target coordinate system 2. The coordinate system selection method according to this embodiment will be described below. As the virtual input coordinate system 4 of this embodiment is selected so that the base vectors approximately form a partial space of dimensions lower than N', a method based on estimation of the frequency distribution of an object will be explained.

The frequency distributions of the original image and output image given by equation (4) will be explained first. Assume that the input image vector $x_v$ at that time has a distribution as shown in FIG. 6A (although the frequency components are complex numbers, but FIG. 6A shows the absolute values of components).

It is impossible to perfectly estimate this input image vector (object) in practice. However, an approximate range of the input image vector can be estimated based on the frequency distribution of an output image.

Figure 6A:
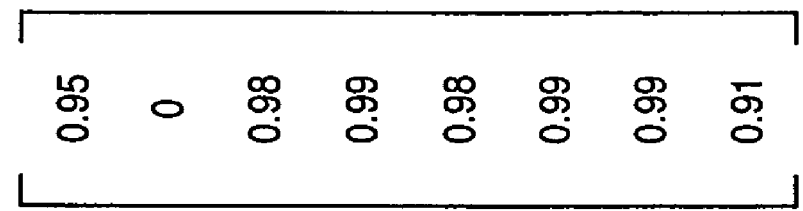
FIGS. 6A to 6C are explanatory views of a weighted matrix associated with settings of virtual input coordinate system 4 according to the first embodiment of the present invention.
Figure 6B:
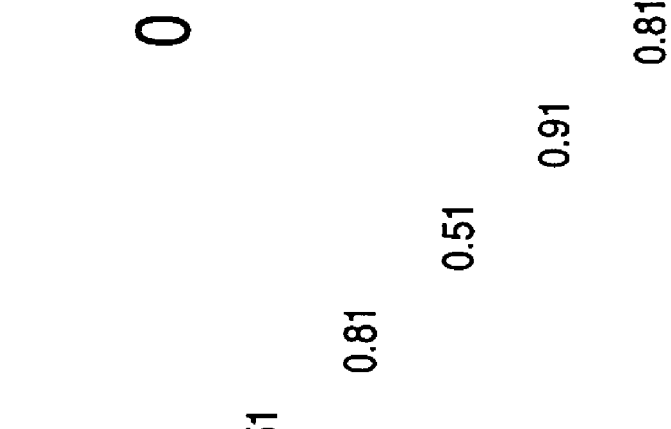
Figure 6C:
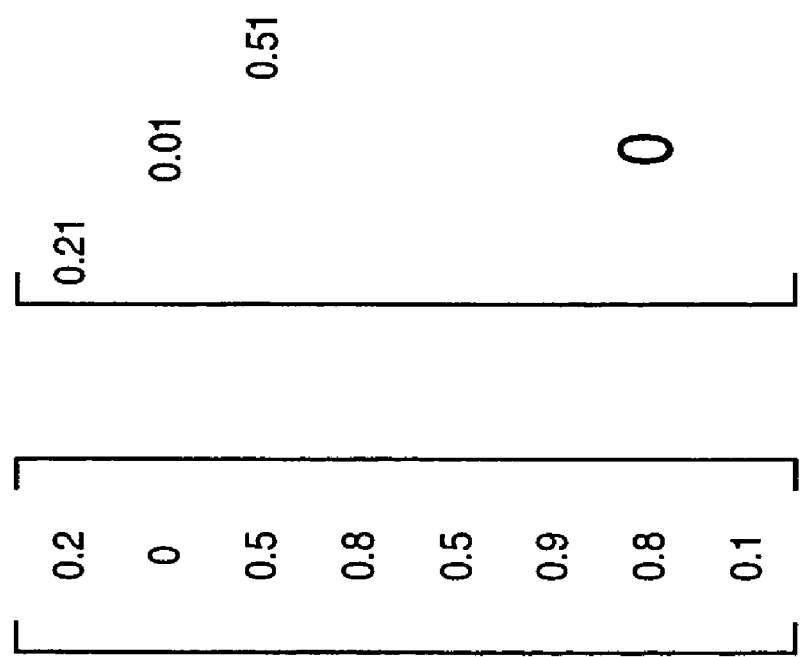

In this embodiment, assuming that values larger by 0.01 than the components of the estimated input image vector shown in FIG. 6A correspond to the upper limit values of the estimation range, weighting components shown in FIG. 6B are extracted as a matrix based on this upper limit value distribution. Using this result, equation (4) is modified as follows:

$$x_v' = S_v x_v = S_v M x_{vir} = S_{vir} x_{vir} \quad (9)$$

where M is the weighted matrix extracted in FIG. 6B, and $x_{vir}$ is a vector after extraction shown in FIG. 6C. Finally, the coordinate system of $x_{vir}$ is adopted as the virtual input coordinate system 4.

Since the base vectors of the coordinate system of the input image vector $x_v$ are the column vectors of a frequency base matrix F, those of the coordinate system of $x_{vir}$ become the column vectors of a matrix FM. The matrix FM is a matrix in which the absolute values of respective base vector components are suppressed according to the weighting distribution of diagonal components of the matrix M, and the virtual input coordinate system 4 can be transformed into the object coordinate system 3 via this matrix FM.

When some base vectors are sufficiently suppressed, the coordinate system formed by the matrix FM approximately forms a low-dimensional partial space defined by base vectors whose norms are not suppressed.

When the virtual input coordinate system 4 is selected in this way, the singular value decomposition of the matrix S can obtain the same effect as that upon reducing the number of dimensions of the transmission coordinate system 13 shown in FIG. 5. If the number of effective dimensions of the transmission coordinate system 13 is represented by the number of base vectors whose norms are not suppressed, the difference from the number of dimensions of the reception coordinate system 14 becomes small, thus transferring most pieces of information of the object as signal components. For this reason, the reconstruction precision of original image building information can be improved, and a higher aliasing noise suppression effect can be obtained.

In this embodiment, the transformation matrix S from the first input image data (virtual input coordinate system 4) calculated in this way to the output coordinate system 1, and the transformation matrix $S_i$ from the virtual input coordinate system 4 to the target coordinate system 2 are calculated for input image data (object), and a transformation matrix from the output coordinate system 1 to the target coordinate system 2, i.e., the interpolation matrix H, is calculated based on the generalized inverse matrix $S^{-g}$ of the transformation matrix S and the transformation matrix $S_i$.

In other words, since the virtual input coordinate system 4, and the generalized inverse matrix of the transformation matrix from the virtual input coordinate system 4 to the output coordinate system 1 are used, and the virtual input coordinate system 4 becomes a coordinate system which is obtained by weighting the base vectors of the coordinate system that expresses the input image data vector according to estimation of the frequency distribution of the input image data vector (object), the norms of a plurality of base vectors are suppressed. For this reason, using the virtual input coordinate system 4, the image reconstruction precision based on the generalized inverse matrix can be improved, and aliasing noise can be suppressed.

Note that the virtual input coordinate system 4 of this embodiment extracts the weighted matrix M based on the frequency distribution of a specific object. Alternatively, for example, a frequency range to which a plurality of objects belong may be estimated, and the upper limit values of that range may be used. However, in this case, an interpolation matrix effective for a plurality of objects can be generated, but the aliasing suppression performance drops since the ratio of suppressing the absolute values of the base vectors of the virtual input coordinate system 13 lowers.

Also, the weighted matrix M may be extracted based on the distribution that has undergone various transformations such as wavelet transformation and discrete cosine transformation used in image compression and the like in place of the frequency distribution of an object. When these transformations are used, the number of vector components required to express an image becomes small, thus further expecting improvement of the aliasing suppression effect.

The output coordinate system 1 and target coordinate system 2 can be arbitrarily selected. However, it is desirable to avoid selection that largely improves the resolution on the target coordinate system 2. This is for the following reason. That is, although the number of dimensions of the virtual input coordinate system 4 can be reduced by the aforementioned method, it is difficult to estimate high-frequency components which are not acquired by an image and, hence, it is difficult to largely improve the resolution in principle.

Second Embodiment

The second embodiment of the present invention relates to an interpolation method which can improve the aliasing noise suppression effect compared to the first embodiment. The interpolation processing sequence of this embodiment is the same as that described in the first embodiment, as shown in FIG. 1, but the coordinate system selection method is different. Note that points which are not particularly mentioned in this embodiment are the same as those in the first embodiment.

Figure 7:
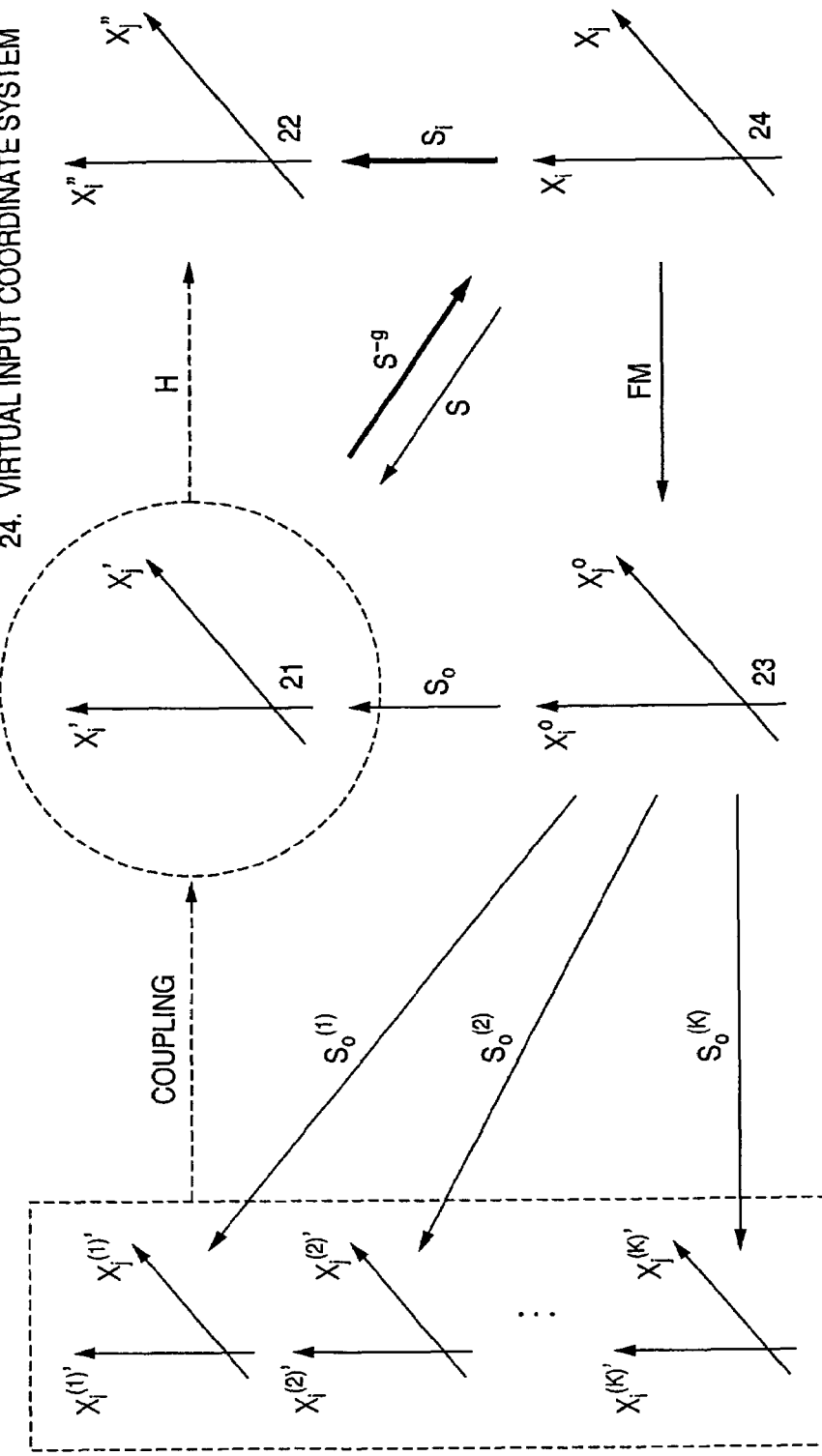
FIG. 7 is an explanatory view of coordinate systems and transformation matrices according to the second embodiment of the present invention.

FIG. 7 shows the relationship between the coordinate systems and transformation matrixes according to this embodiment. A coupled output coordinate system 21 is a coordinate system of a vector obtained by coupling multi-dimensional vectors that express a plurality of output images for an identical object or images estimated using different color filters (RGB). For example, a vector $x_{lin}'$ obtained by expressing three output images each having the number N of pixels by the pixel coordinate system, and coupling them is given by:

$$x_{lin}'=(x_1'^T, x_2'^T, x_3'^T)^T \quad (10)$$

where $x_i'$ (i=1, 2, 3) are vectors corresponding to the three output images.

In the interpolation processing of this embodiment, the coupled output coordinate system 21 is handled as the output coordinate system 1 in the first embodiment. A target coordinate system 22, object coordinate system 23, and virtual input coordinate system 24 are those corresponding to the target coordinate system 2, object coordinate system 3, and virtual input coordinate system 4 of the first embodiment.

Figure 8:
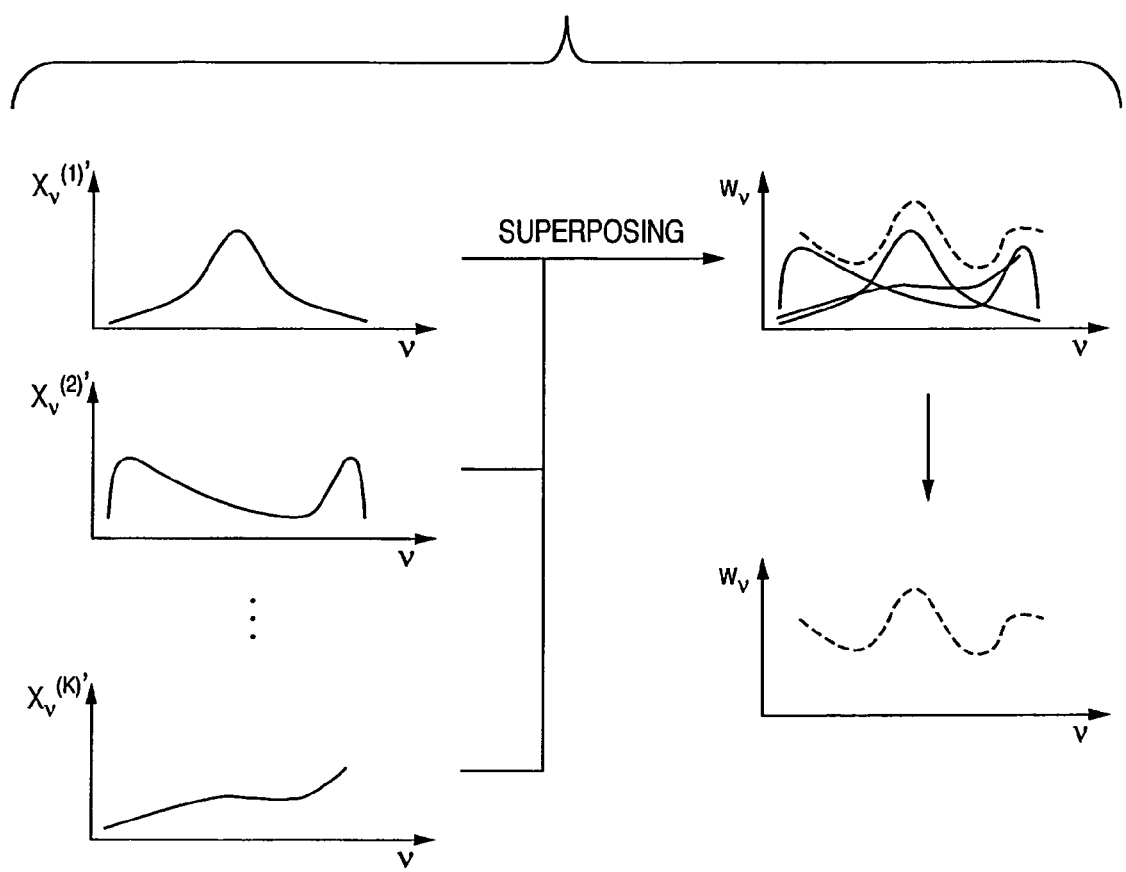
FIG. 8 is a view showing a method of generating a weighted matrix according to the second embodiment of the present invention.

In the selection method of the virtual input coordinate system 24 of this embodiment, a mapping $S_o$ from the object coordinate system 23 to the coupled output coordinate system 21 is derived according to equation (11). Note that the mapping $S_o$ from the object coordinate system 23 to the coupled output coordinate system 21 implies transformation data from the object coordinate system to the output coordinate system, i.e., a transformation matrix from a coordinate system where the object exists to an output coordinate system output from a photoelectric conversion element such as a CCD or the like. $S_o$ includes aberration information (aberration information of an imaging optical system attached to an imaging apparatus used to sense an image) of the imaging apparatus upon imaging.

$$S_o=[S_o^{(1)T}, S_o^{(2)T}, \ldots, S_o^{(K)T}]^T \quad (11)$$

where K is the number of output images to be coupled, and $S_o^{(i)}$ (i=1, 2, ..., K) represents a mapping from the object coordinate system 23 to the pixel coordinate system of the i-th output image. Upon deriving the weighted matrix M, as shown in FIG. 8, weighting functions estimated from the frequency distributions of the output images are superposed, and its upper limit values are used. Then, a mapping S from the virtual input coordinate system 24 to the coupled output coordinate system 21 is given using the matrices $S_o$ and M by:

$$S=S_o FM \quad (12)$$

Since a mapping $S_t$ to the target coordinate system 22 can be arbitrarily determined, an interpolation matrix $H=S^{-g}S_t$ can be generated based on the obtained mapping S.

This embodiment uses the coupled output coordinate system 21, the number of dimensions of which is increased by coupling the output coordinate systems 1. In this way, the difference between the numbers of dimensions of the input coordinate system and coupled output coordinate system can be reduced, and the aliasing noise suppression effect can be improved.

In order to increase the number of dimensions of the coupled output coordinate system 21, column vectors of the mapping $S_o^{(i)}$ to each output coordinate system must have high orthogonality with respect to those of other mappings $S_o^{(j)}$. A plurality of imaging systems which adopt the image reconstruction method based on coupling processing of the output coordinate systems have been conventionally proposed as an imaging system of a method that combines a plurality of imaging results. However, the demerit of this method lies in that a large number of images must be captured within a short period of time while changing conditions, so as to increase the number of dimensions of the output coordinate systems.

However, since this embodiment uses the virtual input coordinate system 24 which has a small number of effective dimensions, the required number of images can be smaller than the methods using only image coupling.

Figure 9:
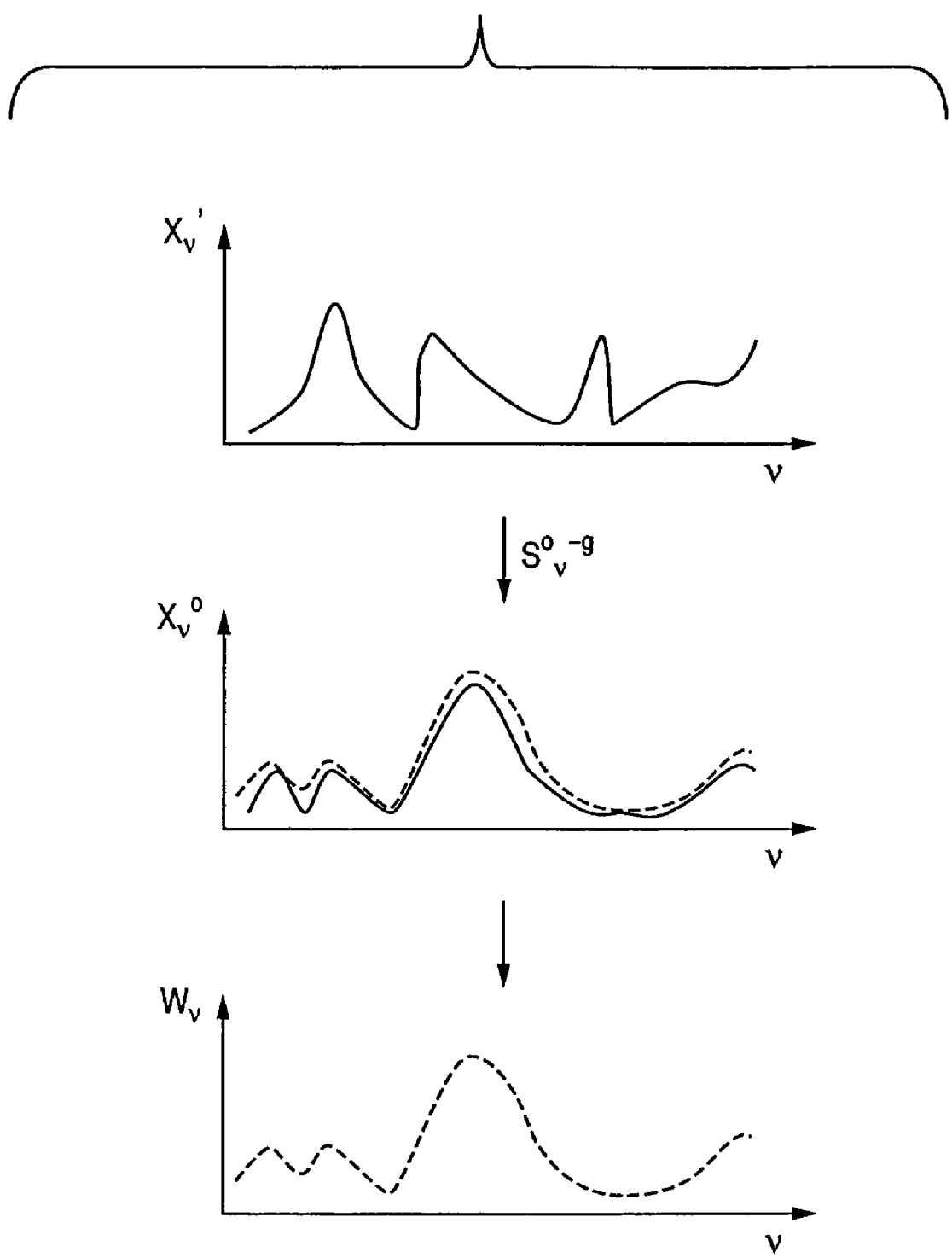
FIG. 9 is a view showing a method of calculating a weighted matrix using a generalized inverse matrix according to the second embodiment of the present invention.

Furthermore, some selection methods of the weighted matrix M are available in addition to the above method. For example, correspondence with a plurality of objects, and wavelet transformation or the like other than frequency transformation may be used as in the first embodiment. A method of using the generalized inverse matrix $S_o^{-g}$ of the mapping $S_o$ from the object coordinate system 23 to the coupled output coordinate system 21, as shown in FIG. 9, is available in place of using the upper limit values of the frequency distribution of the output images to be coupled. The frequency distribution acquired by the generalized inverse matrix $S_o^{-g}$ includes aliasing noise, but it has higher resolution than the output images which form the coupled output coordinate system 21. For this reason, using the upper limit values of the distribution acquired by $S_o^{-g}$, a highly effective weighting distribution can be extracted.

As described above, according to this embodiment, the coupled output coordinate system 21 is calculated from a plurality of output images captured by the imaging system, and the target coordinate system 22 and virtual input coordinate system 24 are appropriately set, thus generating an interpolation matrix which has a higher aliasing noise suppression effect than the interpolation processing described in the first embodiment.

Third Embodiment

Figure 10:
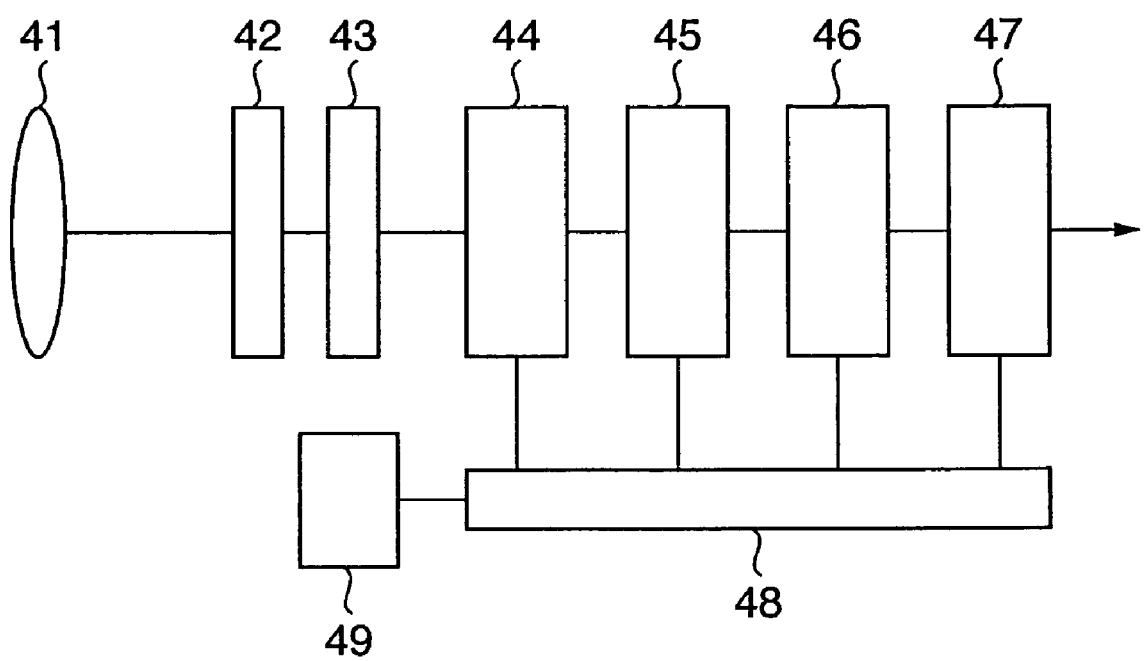
FIG. 10 is a block diagram showing the arrangement of an imaging apparatus according to the third embodiment of the present invention.

The third embodiment of the present invention relates to an imaging apparatus which incorporates an interpolation processing program that can implement the interpolation processing method of the first embodiment. In this embodiment, the weighting distribution (frequency distribution) is generated based on an output image obtained by photoelectric conversion, and a coordinate transformation matrix generation circuit 45 in the imaging apparatus generates an interpolation matrix H. FIG. 10 is a block diagram showing the arrangement of the imaging apparatus according to this embodiment.

The light intensity distribution from an object obtained by a photographing lens system 41 is received by a light-receiving element 42. An analog signal obtained by this light-receiving element 42 is converted into a digital signal by an A/D conversion circuit 43, and the digital signal is stored in a memory 44. Note that the photographing lens system (imaging optical system) and the light-receiving element such as a CCD or the like form image data acquisition unit (a unit adapted to acquire image data by photoelectrically converting an object image).

A local image is acquired from the memory 44, and is output to the coordinate transformation matrix generation circuit 45. Note that coordinate transformation matrices indicate the mapping S from the virtual input coordinate system (space) 4 to the output coordinate system 1 and the mapping $S_t$ from the virtual input coordinate system 4 to the target coordinate system 2 in the first embodiment.

The coordinate transformation matrices and local images are output to a matrix operation circuit 46, which performs matrix operations to obtain interpolation results of the local images. An image combination circuit 47 combines the local interpolation results to obtain an output image. Decomposition and combination of an image, and the flow of data from the coordinate transformation matrix generation circuit 45 to the matrix operation circuit 46 are controlled in accordance with control signals from an interpolation processing controller 48. The operation of the interpolation processing controller 48 can be set by a program memory 49.

Figure 11:
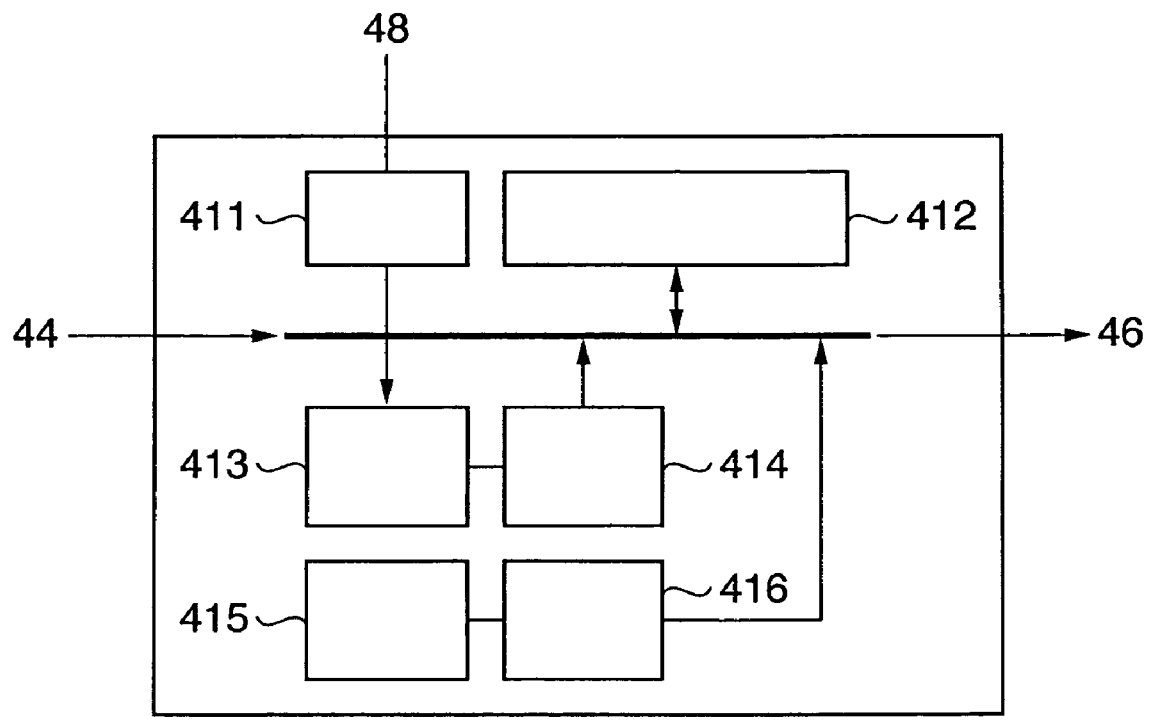
FIG. 11 is a block diagram showing the arrangement of an interpolation matrix generation circuit according to the third embodiment of the present invention.

FIG. 11 is a block diagram showing the detailed arrangement of the coordinate transformation matrix generation circuit 45. The output coordinate system 1 and target coordinate system 2 which are to undergo coordinate transformation use pixel coordinate systems, and the virtual input coordinate system 4 uses a weighted wavelet-transformed coordinate system. The wavelet transformation is transformation used in signal processing and image compression. Various transformations from transformation having orthonormality to that having biorthogonality are available, and can be arbitrarily selected. As is known, the wavelet-transformed coordinate system can express an image using a smaller number of vector components. Therefore, since the number of vector components to be considered in the weighting distribution can be reduced using this coordinate system, a high dimension compression effect can be expected.

In the coordinate transformation matrix generation circuit 45 with the above arrangement, a data flow controller unit 411 changes a data transfer path in accordance with a control signal from the interpolation processing controller 48. Local image data acquired from the main memory 44 is transferred to a temporary storage memory 412, and the local image data stored in the temporary storage memory 412 is transformed by a wavelet transformation unit 413, thus outputting the transformed local image to a weighting distribution generation unit 414.

The weighting distribution generation unit 414 extracts a weighting distribution that covers the entire transformation distribution shown in FIG. 6B of the first embodiment from the absolute values of the wavelet transformation distribution of the local image. This weighting distribution is transmitted to a matrix generation unit 416 and matrix components obtained as results are stored in the temporary storage memory 412.

This matrix generation unit 416 multiplies row vectors of matrices $S_o'$ and $S_{oi}'$ stored in a basic matrix data storage memory 415 by weights obtained by the weighting distribution generation unit 414.

Note that the matrices $S_o'$ and $S_{oi}'$ are those which are obtained by applying processing given by the next equation to $S_o$ as the transformation matrix from the object coordinate system 3 to the output coordinate system 1 and $S_{oi}$ as the transformation matrix to the target coordinate system 2 in the first embodiment:

$$S_j' = S_j f^{-1}(I) \tag{13}$$

where j is index o or oi of coordinate transformation. $f^{-1}(A)$ is inverse transformation of the transformation executed by the wavelet transformation unit 413, and is executed for respective column vectors of an argument matrix A. I is a unit matrix. Note that matrices obtained by multiplying row vectors of $S_o'$ and $S_{oi}'$ by weights are represented by $S_o''$ and $S_{oi}''$. These matrices correspond to the mapping from the virtual input coordinate system 4 to the output coordinate system 1 and that to the target coordinate system 2 in the first and second embodiments. $S_o''$ and $S_{oi}''$ are stored in the temporary storage memory 412.

A generalized inverse matrix may be generated directly using singular value decomposition. However, since the computation volume becomes huge, when the dimension compression amount by the weighted matrix is small, the generalized inverse matrix can be calculated according to:

$$S_o''^{-g} = S_{or}''^T (S_{or}'' S_{or}''^T)^{-1} \tag{14}$$

where $S_{or}''$ is an (N×N')-dimensional matrix (N is the number of sample points, and N' is the number of dimensions of the vector space) which is formed of only nonzero row vectors $S_i$ (i=1, 2, ..., N) of $S_o''$, as described by:

$$S_o'' = [S_1, 0, S_2, 0, \ldots, S_N]^T \rightarrow S_{or}'' = [S_1, S_2, \ldots S_N]^T \tag{15}$$

When an inverse matrix is calculated, the same generalized inverse matrix as that obtained by the method using the singular value decomposition can be obtained by equation (14). If the dimension compression amount is large, an inverse matrix in equation (14) cannot be calculated. If such case is also assumed, a Penrose convergence calculation method or the like described in Kamiya, "Computational Linear Algebra", Kyoritsu Shuppan (1999) may be used.

An interpolation matrix $H = S_{oi}'' S_o''^{-g}$ is generated based on the finally obtained generalized inverse matrix $S_o''^{-g}$ and the matrix $S_{oi}''$ stored in the temporary storage memory 412.

As described above, in this embodiment, the interpolation processing program of the first or second embodiment is executably incorporated in the imaging apparatus, and the weighting distribution of an object is estimated from the output image from the imaging system upon imaging, thus generating the interpolation matrix H. Hence, an imaging apparatus having a high aliasing noise suppression effect can be provided.

Fourth Embodiment

In the fourth embodiment of the present invention, the weighting distribution of an object is set in advance in place of weighting an object for each output image from the imaging system unlike in the third embodiment. That is, the interpolation matrix H is stored in a memory or the like before image acquisition. In this way, by storing the interpolation matrix H generated by the interpolation processing method of the first or second embodiment in advance, the computation volume after image acquisition can be reduced. Note that points which are not particularly mentioned in this embodiment are the same as those in the third embodiment.

Note that estimation of the weighting distribution of this embodiment adopts a method that focuses attention on directional dependence of the frequency of an object. When the frequency components of an object depend on directions, the number of effective dimensions of the virtual input coordinate system 4 can be reduced by weighting independent directions. When an object is an artificial object, since it includes many frequency components depending on directions, this method is often effective. FIG. 12 shows an example of the weighting distribution when an object has the frequency distribution in the y-axis direction. A plurality of such weighting distributions having different attenuation directions and attenuation amounts are used.

In the interpolation matrix generation processing of this embodiment as well, the output coordinate system 1 and target coordinate system 2 use pixel coordinate systems, and the virtual input coordinate system 4 uses a coordinate system obtained by multiplying the frequency coordinate system by the above weights.

Figure 13:
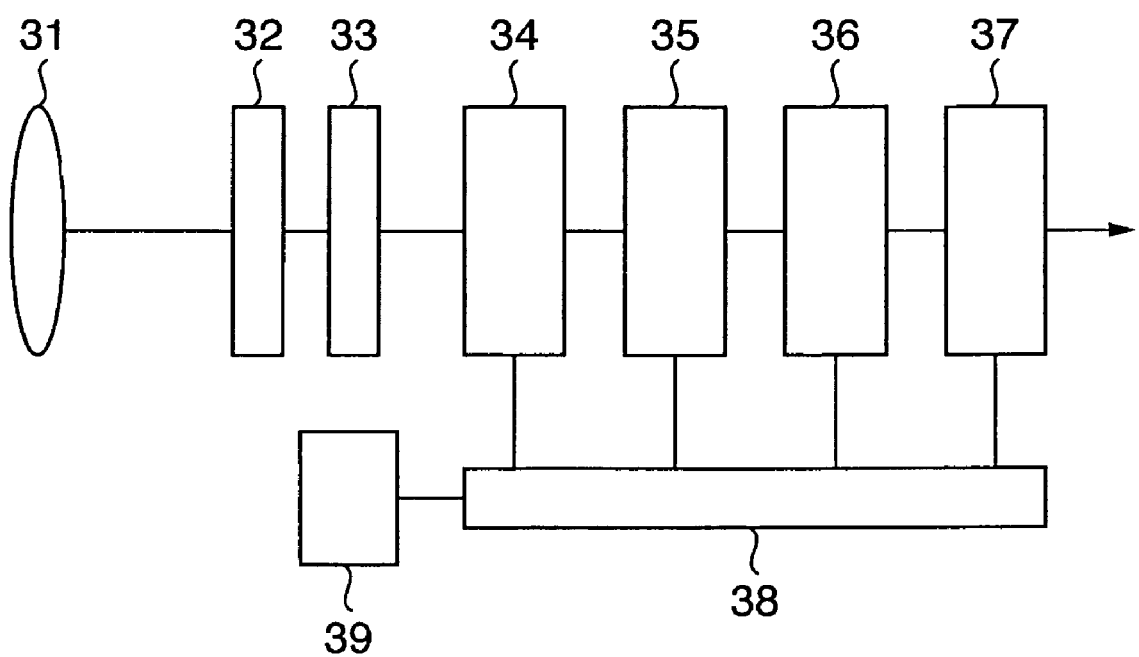
FIG. 13 is a block diagram showing the arrangement of an imaging apparatus according to the fourth embodiment of the present invention.

FIG. 13 is a block diagram showing the arrangement of the imaging apparatus of this embodiment. The light intensity distribution from an object obtained by a photographing lens system 31 is received by a light-receiving element 32. An analog signal obtained by this light-receiving element 32 is converted into a digital signal by an A/D conversion circuit 33, and the digital signal is stored in a memory 34. Next, the memory 34, an interpolation matrix selection circuit 35, a matrix operation circuit 36, and an image combination circuit 37 are controlled by control signals generated by an interpolation processing controller 38. The control sequence in the interpolation processing controller 38 is programmed in advance in a program memory 39.

Figure 14:
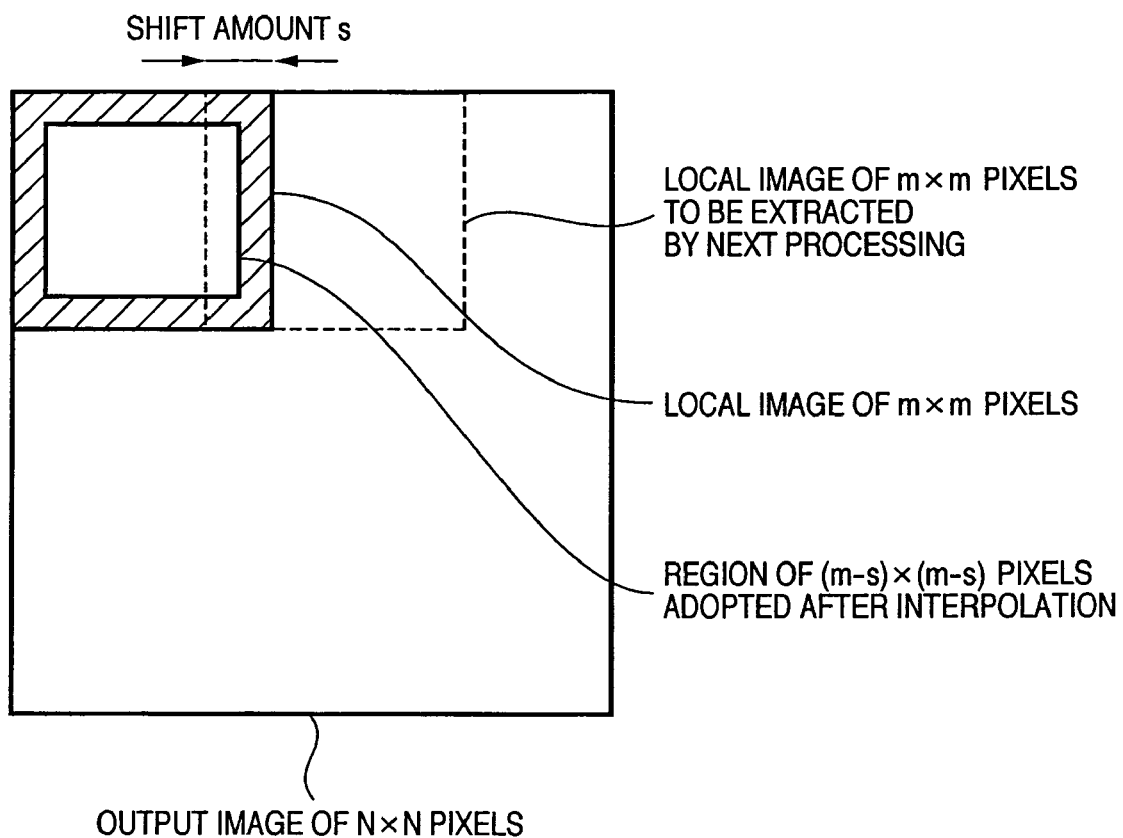
FIG. 14 is an explanatory view of a local image used in arithmetic processing according to the fourth embodiment of the present invention.

In the interpolation processing of this embodiment, an interpolation matrix selected by the interpolation matrix selection circuit 35 is applied to a local region of m×m pixels in the output image from the imaging system. At this time, attenuation of pixel values around the local image after interpolation poses a problem. In this case, each local region is selected while overlapping by s pixels, as shown in FIG. 14, and (m−s)×(m−s) pixels of the central portion after interpolation are applied, thus acquiring an accurate value.

Figure 15:
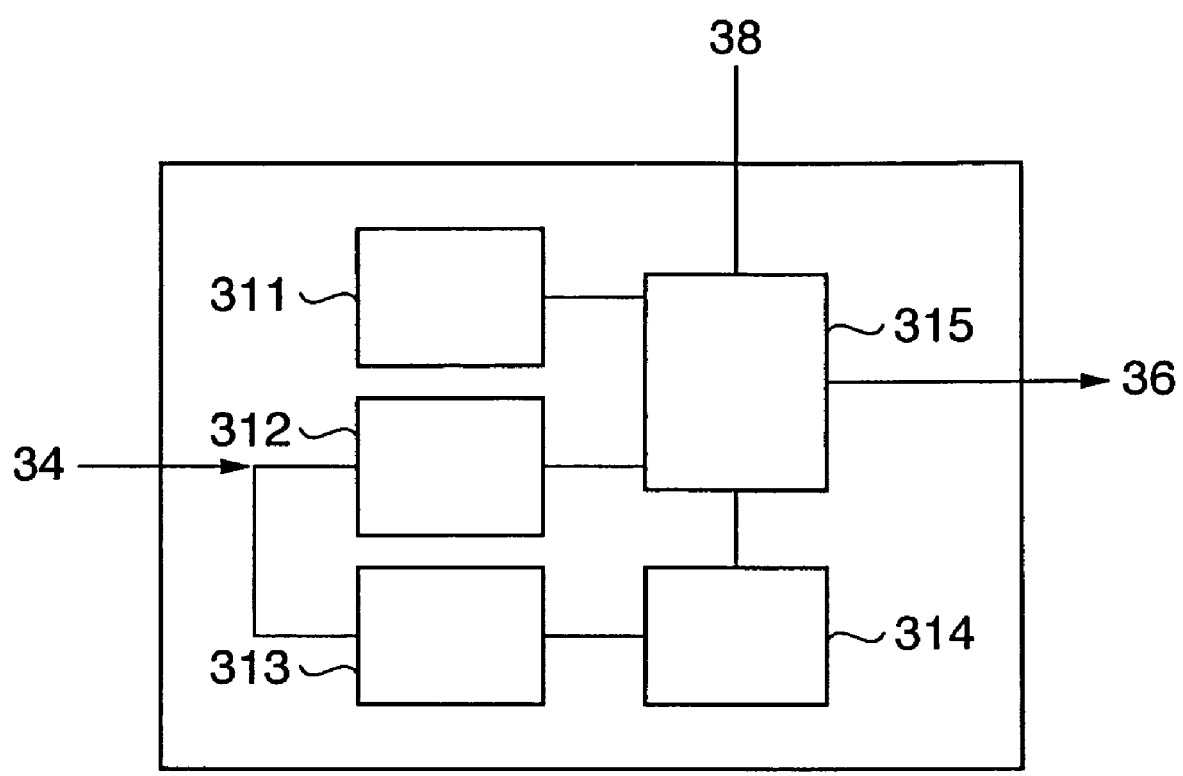
FIG. 15 is a block diagram showing the arrangement of an interpolation matrix selection circuit according to the fourth embodiment of the present invention.

The control flow of the interpolation processing controller 38 will be described below. FIG. 15 is a block diagram showing the arrangement of the interpolation matrix selection circuit 35. A local image is extracted from the memory 34, and is output to the interpolation matrix selection circuit 35. An internal memory 311 stores weighting distributions and corresponding interpolation matrices. The extracted local image is stored in a temporary storage memory 312, and is output in turn to a frequency transformation unit 313 and comparison unit 314. The frequency transformation unit 313 generates the frequency distribution of the local image, and the comparison unit 314 executes comparison processing of the absolute values of the weighting distribution and the frequency distribution of the local image. This comparison processing generates a comparison value W given by:

$$W = \Sigma_i (a_i/w_i)^2 \qquad (16)$$

where i is an index indicating a pixel in the local image and weighting distribution: $a_i$ is the i-th pixel value in the local image, and $w_i$ is the i-th weight in the weighting distribution. However, this equation is calculated excluding pixels with zero weight $w_i$. When the pixel value of an image is normalized to a maximum of 1, an interpolation matrix corresponding to the weighting distribution which can yield the comparison value W closest to the total number of pixels (except for pixels dropped in calculation) of the local image is applied.

Subsequently, the selected interpolation matrix (the interpolation matrix selected based on image data, interpolation data) and the local image are output to the matrix operation circuit 36 to execute multiplication processing, and the interpolation results of the local images are combined by the image combination circuit 37 to be output as an interpolated image after the interpolation processing.

As described above, in this embodiment, since the interpolation processing is done by the interpolation matrix H generated in correspondence with the weighting distribution prepared in advance, and the interpolation matrix generation processing is skipped upon image acquisition, the computation volume after image acquisition can be reduced, i.e., the processing load can be reduced and the processing speed can be increased compared to the third embodiment. For this reason, an imaging apparatus which can implement more suitable interpolation processing can be realized.

In the above embodiment, the interpolation processing method can be executed by the imaging apparatus as an interpolation processing program. Alternatively, the interpolation processing method can be configured as a part of an image processing apparatus or an independent interpolation processing apparatus. More specifically, an interpolation processing apparatus (circuit) comprises an object information estimation unit which estimates object information (frequency distribution or weighted matrix), a virtual input image generation unit which generates the virtual input coordinate system (first input image data) 4 based on this object information, a transformation matrix generation unit which generates a first transformation matrix S from the virtual input coordinate system 4 to image data, and a second transformation matrix $S_i$ from the virtual input coordinate system 4 to interpolated image data after the interpolation processing, an interpolation matrix generation unit which generates an interpolation matrix H using the first and second transformation matrices S and $S_i$, and a control unit which executes interpolation processing using the interpolation matrix H. Such apparatus (or circuit) can execute interpolation processing in the processing flow of image processing.

Note that the following embodiments of the present invention are available.

(1) An interpolation processing method for executing interpolation processing by multiplying an output image data vector of an imaging system by an interpolation matrix, is characterized in that the interpolation matrix is generated in accordance with a first step of determining a coordinate system that expresses an input data vector of the imaging system, a second step of estimating a distribution of input image data on the coordinate system, a third step of forming a virtual input coordinate system using the estimated distribution and a base vector of the coordinate system, a fourth step of calculating a generalized inverse matrix of a transformation matrix from the virtual input coordinate system into a coordinate system of the output data vector, and a fifth step of calculating the interpolation matrix using a transformation matrix from the virtual input coordinate system to a coordinate system that expresses an image data vector as an interpolation result, and the generalized inverse matrix.

(2) The interpolation processing method described in (1), is characterized in that the base vector of the coordinate system determined in the first step forms a unitary matrix.

(3) The interpolation processing method described in (2), is characterized in that the unitary matrix is a Fourier-transformed matrix.

(4) The interpolation processing method described in (2), is characterized in that the unitary matrix is a matrix classified into orthogonal wavelet transformation.

(5) The interpolation processing method described in (1), is characterized in that a base vector of the coordinate system determined in the first step is a matrix classified to biorthogonal wavelet transformation.

In the embodiment according to (1), the virtual input coordinate system and the generalized inverse matrix of the transformation matrix from the virtual input coordinate system to the output coordinate system are used. The virtual input coordinate system is obtained by weighting the base vector of the coordinate system that represents the input image data vector in accordance with the estimated distribution of the input image data vector, and the norms of a plurality of base vectors are suppressed. By using the virtual input coordinate system in this way, the image reconstruction precision of the generalized inverse matrix can be improved, thus suppressing aliasing noise.

In the embodiment according to (1) to (5), the selection method of the coordinate system that expresses the input image data vector is changed to improve the aliasing noise suppression effect of the interpolation processing method of (1). Since an output image including aliasing noise is mixed with frequency components of an input image, the estimation precision changes depending on the selected coordinate system upon estimating input image data using output image data. Hence, in the method of (2) to (5), input image data is estimated based on a predetermined coordinate system. When information can be precisely acquired on respective coordinate systems, the aliasing noise suppression effect can be enhanced.

As described above, according to this embodiment, since interpolation data is generated in accordance with first input image data generated based on object information, noise suppression that considers the dependence of aliasing noise on an object can be implemented. Therefore, aliasing noise suppression which is hardly controlled by the conventional interpolation processing can be suitably controlled, and a high-quality image can be reconstructed.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-010032 filed on Jan. 18, 2005, which is hereby incorporated by reference herein in its entirety.

What is claimed is:

1. An interpolation processing method for obtaining interpolated image data by performing interpolation processing on sensed image data obtained by photoelectrically converting an object image, the method comprising:
   a first step of estimating a frequency distribution of the object image using the sensed image data;
   a second step of creating a virtual coordinate system based on the frequency distribution of the object image, and generating virtual image concerning the frequency distribution of the object image on the created virtual coordinate system;
   a third step of generating a first transformation matrix that performs image data transformation to the virtual coordinate system from a sensing coordinate system to which the sensed image data belongs;
   a fourth step of generating a second transformation matrix that performs image data transformation from the virtual coordinate system to an interpolation coordinate system to which the interpolated image data belongs;
   a fifth step of generating, using the first transformation matrix and the second transformation matrix, a third transformation matrix that performs image data transformation from the sensing coordinate system to the interpolation coordinate system; and
   a sixth step of generating the interpolated image data by transforming the sensed image data using the third transformation matrix.

2. A computer-readable medium storing a program executable by a computer to execute an interpolation processing method for obtaining interpolated image data by performing interpolation processing on sensed image data obtained by photoelectrically converting an object image, the program being executable by the computer to execute the method comprising:
   a first step of estimating a frequency distribution of the object image using the sensed image data;
   a second step of creating a virtual coordinate system based on the frequency distribution of the object image, and generating virtual image data concerning the frequency distribution of the object image of the created virtual coordinate system;
   a third step of generating a first transformation matrix that performs image data transformation to the virtual coordinate system from a sensing coordinate system to which the sensed image data belongs;
   a fourth step of generating a second transformation matrix that performs image data transformation from the virtual coordinate system to an interpolation coordinate system to which the interpolated image data belongs;
   a fifth step of generating, using the first transformation matrix and the second transformation matrix, a third transformation matrix that performs image data transformation from the sensing coordinate system to the interpolation coordinate system; and
   a sixth step of generating the interpolated image data by transforming the sensed image data using the third transformation matrix.

3. An imaging apparatus comprising:
   the computer-readable medium of claim 2; and
   a control unit adapted to perform interpolation processing using the program stored in the computer-readable medium.

4. An interpolation processing apparatus for obtaining interpolated imaged data by performing interpolation processing on sensed image data obtained by photoelectrically converting an object image, the apparatus comprising:
   estimation unit adapted to estimate a frequency distribution of the object image using the sensed image data;
   a generation unit adapted to create a virtual coordinate system based on the frequency distribution of the object image, and generate virtual image data concerning the frequency distribution of the object image on the created virtual coordinate system;
   a transformation matrix generation unit adapted to generate a first transformation matrix that performs image data transformation to the virtual coordinate system from a sensing coordinate system to which the sensed image data belongs, a second transformation matrix that performs image data transformation from the virtual coordinate system to an interpolation coordinate system to which the interpolated image belongs, and a third transformation matrix that performs image data transformation from the sensing coordinate system to the interpolation coordinate system using the first transformation matrix and the second transformation matrix; and
   an interpolation data generation unit adapted to generate the interpolated image data by transforming the sensed image data using the third transformation matrix.

* * * * *